US011728496B2

(12) United States Patent
Champagne et al.

(10) Patent No.: US 11,728,496 B2
(45) Date of Patent: Aug. 15, 2023

(54) PROPULSION BATTERY PACKS WITH INTEGRATED FUEL TANK MOUNTING SYSTEMS

(71) Applicant: GM GLOBAL TECHNOLOGY OPERATIONS LLC, Detroit, MI (US)

(72) Inventors: Randall S. Champagne, Riverview, MI (US); Alexander M. Bilinski, Avoca, MI (US); John A. Martuscelli, Shelby Township, MI (US); Michael E. Fraeyman, Chesterfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 17/195,980

(22) Filed: Mar. 9, 2021

(65) Prior Publication Data
US 2022/0293978 A1 Sep. 15, 2022

(51) Int. Cl.
*B60L 50/75* (2019.01)
*H01M 8/04082* (2016.01)
*B60K 1/00* (2006.01)
*B60K 1/04* (2019.01)
*B60K 15/03* (2006.01)
(Continued)

(52) U.S. Cl.
CPC ........... *H01M 8/04216* (2013.01); *B60K 1/00* (2013.01); *B60K 1/04* (2013.01); *B60K 15/03177* (2013.01); *B60K 15/067* (2013.01); *B60L 50/75* (2019.02); *B60L 53/53* (2019.02);
(Continued)

(58) Field of Classification Search
CPC .......... B60L 53/53; B60L 53/54; B60L 50/64; B60L 50/72; B60L 50/75; B60K 15/067; B60K 15/03177; B60K 2001/0411; B60K 2001/0416; B60K 2001/0438;
(Continued)

(56) References Cited

U.S. PATENT DOCUMENTS 3,455,743 A 7/1969 Huebscher et al.
5,478,662 A 12/1995 Strasser
(Continued)

OTHER PUBLICATIONS

U.S. Dep't of Energy, Fuel Cell Technologies Office, "Hydrogen Storage", DOE/EE-1552 (Mar. 2017), 2 pages.

*Primary Examiner* — Jeffrey J Restifo
(74) *Attorney, Agent, or Firm* — Quinn IP Law

(57) ABSTRACT

Presented are battery assemblies with integrated fuel tanks, methods for making/using such battery assemblies, and fuel cell electric vehicles having rechargeable traction battery packs with integrated fiber-composite hydrogen fuel tanks. A rechargeable energy storage system (RESS) assembly includes a battery pack housing with an internal battery module compartment located between two tank mounting cavities. Each mounting cavity is recessed into a respective lateral side of the battery pack housing. Multiple rechargeable battery modules are electrically interconnected with one another and mounted inside the battery module compartment. Each battery module contains multiple battery cells, such as a stack of series-connected lithium-ion pouch cells. A fuel tank is mounted in each of the tank mounting cavities on the lateral sides of the battery pack housing. Each fuel tank, which may be fabricated from a carbon fiber reinforced polymer, stores and selectively dispenses a fuel, such as a hydrogen-rich, compressed gas fuel.

20 Claims, 4 Drawing Sheets

(51) Int. Cl.
  *B60L 53/53* (2019.01)
  *B60K 15/067* (2006.01)
(52) U.S. Cl.
  CPC .............. *B60K 2015/03315* (2013.01); *B60K 2015/03493* (2013.01); *H01M 2250/20* (2013.01)
(58) Field of Classification Search
  CPC .... H01M 8/249; H01M 8/2495; H01M 8/247; H01M 2250/20
  See application file for complete search history.

(56) References Cited

U.S. PATENT DOCUMENTS

| | | | |
|---|---|---|---|
| 6,602,624 B1 | 8/2003 | Doan et al. | |
| 6,835,477 B1 | 12/2004 | Brambilla et al. | |
| 6,841,292 B2 | 1/2005 | Nelson et al. | |
| 6,866,955 B2 | 3/2005 | Lee et al. | |
| 7,137,466 B2 * | 11/2006 | Kawasaki | B60L 50/71 |
| | | | 429/408 |
| 7,160,341 B2 | 1/2007 | Sinha et al. | |
| 7,264,895 B2 | 9/2007 | White | |
| 7,759,010 B2 | 7/2010 | Hoch | |
| 7,955,743 B2 | 6/2011 | Ganapathy et al. | |
| 8,313,871 B2 | 11/2012 | Wexel et al. | |
| 8,603,654 B2 | 12/2013 | Cartwright et al. | |
| 9,997,811 B2 | 6/2018 | Champagne et al. | |
| 10,038,173 B2 | 7/2018 | Curtis et al. | |
| 10,403,945 B2 | 9/2019 | Champagne et al. | |
| 10,589,788 B1 * | 3/2020 | Milton | B62D 21/02 |
| 2004/0058224 A1 | 3/2004 | Eshraghi et al. | |
| 2008/0050640 A1 | 2/2008 | Sun et al. | |
| 2011/0039190 A1 | 2/2011 | Owejan et al. | |
| 2011/0207012 A1 | 8/2011 | Frost et al. | |
| 2014/0335432 A1 | 11/2014 | Sinha et al. | |
| 2015/0180079 A1 | 6/2015 | Leger et al. | |
| 2016/0204401 A1 | 7/2016 | Curtis et al. | |
| 2017/0058420 A1 | 3/2017 | Goulet et al. | |
| 2019/0252705 A1 | 8/2019 | Mathias et al. | |
| 2020/0180445 A1 * | 6/2020 | Kataoka | H01M 8/04089 |
| 2021/0104756 A1 * | 4/2021 | Yoshitomi | H01M 8/04201 |
| 2021/0135255 A1 * | 5/2021 | Sawada | H01M 8/04708 |
| 2021/0143453 A1 * | 5/2021 | Yoshitomi | H01M 8/04067 |
| 2021/0260994 A1 * | 8/2021 | Gambone | B60K 15/067 |
| 2022/0081040 A1 * | 3/2022 | Choi | B60K 1/04 |
| 2022/0097516 A1 * | 3/2022 | Iijima | B60L 50/71 |
| 2022/0105791 A1 * | 4/2022 | Hendriks | B60K 15/063 |
| 2022/0293978 A1 * | 9/2022 | Champagne | B60L 50/72 |

* cited by examiner

PROPULSION BATTERY PACKS WITH INTEGRATED FUEL TANK MOUNTING SYSTEMS

INTRODUCTION

The present disclosure relates generally to fuel cell systems for converting fuels, often hydrogen-rich fluids, into electricity. More specifically, aspects of this disclosure relate to propulsion battery pack and fuel tank mounting architectures for fuel cell vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

HEV and FEV powertrains take on various architectures, some of which utilize a fuel cell system to supply electricity for powering the vehicle's traction motor(s). A fuel cell is an electrochemical device generally composed of an anode electrode that receives hydrogen ($H_2$), a cathode electrode that receives oxygen ($O_2$), and an electrolyte interposed between the anode and cathode. An electrochemical reaction is induced to oxidize hydrogen molecules at the anode to generate free protons (H+), which are then passed through the electrolyte for reduction at the cathode with an oxidizing agent. In particular, hydrogen molecules in a hydrogen-rich fuel are catalytically split in an oxidation half-cell reaction in the anode catalyst layer to generate free hydrogen protons and electrons. These hydrogen protons pass through the electrolyte to the cathode, where the hydrogen protons react with oxygen and electrons in the cathode to form stack by-products, including water. Electrons from the anode, however, cannot pass through the electrolyte; these electrons are redirected through a load, such as a vehicle's traction motor or rechargeable battery pack, before being sent to the cathode.

Fuel cell designs commonly employed in automotive applications utilize a solid polymer electrolyte membrane (PEM)—also referred to as a "proton exchange membrane"—to provide ion transport between the anode and cathode. Proton exchange membrane fuel cells (PEMFC) generally employ a solid polymer electrolyte (SPE) proton-conducting membrane, such as a perfluorosulfonic acid membrane, to separate product gases and provide electrical insulation of electrodes, in addition to conduction of protons. The anode and cathode typically include finely dispersed catalytic particles, such as platinum, supported on carbon particles and mixed with an ionomer. This catalytic mixture is deposited on the sides of the membrane to form the anode and cathode layers. The combination of the anode catalytic layer, cathode catalytic layer, and electrolyte membrane define a membrane electrode assembly (MEA) in which the anode catalyst and cathode catalyst are supported on opposite faces of the ion conductive solid polymer membrane.

Many commercially available fuel cell vehicles (FVC) employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Compared to the 6-cell construction of a 12V SLI battery, contemporary traction battery packs group hundreds or thousands of battery cells that are stacked into individual battery modules that are mounted onto the vehicle chassis, e.g., by a battery pack housing or support tray. A standard lithium-ion battery (LiB) cell is composed to two conductive electrodes, an electrolyte material, and a permeable separator, all of which are enclosed inside an electrically insulated packaging. Rechargeable LiB cells operate by reversibly passing lithium ions back and forth between mating negative and positive working electrodes and through the permeable separator. Stacked electrochemical battery cells may be connected in series or parallel through use of an electrical interconnect board (ICB). A dedicated Electronic Battery Control Module (EBCM), through collaborative operation with a Powertrain Control Module (PCM) and Traction Power Inverter Module (TPIM), regulates the opening and closing of battery pack contactors to govern operation of the battery pack.

SUMMARY

Presented herein are electrochemical battery assemblies with integrated fuel tanks, methods for manufacturing and methods for employing such battery assemblies, and fuel cell electric vehicles (FCEV) having rechargeable traction battery packs with integrated fiber-composite hydrogen fuel tanks. By way of example, a rechargeable energy storage system (RESS) combines a pair of carbon-fiber reinforced polymer (CFRP) hydrogen tanks into the pack housing of a multi-module battery pack. Each high-pressure CFRP hydrogen tank is located on a respective lateral side of the pack housing; both tanks extend the fore-aft length of the battery pack to concomitantly close off the housing's port and starboard sides. The CFRP hydrogen tanks may be jacketed in compressible isolation pads and rigidly secured to a central module compartment of the battery pack housing via tightening straps. Inboard segments of the straps are anchored to strap mounting brackets while outboard ends of the straps are secured together via worm-gear clamps, T-bolt clamps, or rigid backing plates. A rectangular array of battery modules (e.g., 12 modules each containing 15-30 Li-ion cells) may be sandwiched between the CFRP hydrogen tanks, stacked on bottom and center support plates of the central module compartment. A top plate closes off the upper extent of the module compartment and two end plates close off longitudinal ends of the battery pack housing. A set of longitudinal rails may be wedged between each tank and their adjoining battery modules.

Attendant benefits for at least some of the disclosed concepts include propulsion battery and tank structural mounting architectures that utilize the stiffness and shape of the fuel tanks to lock in and seal the RESS battery modules while increasing the pack's robustness and structural stiffness. The cylindrical shape of the tanks may also lock in the top and bottom plates of the battery pack housing, whereas the center support plate of the RESS maintains tank-to-tank spacing while providing improved cross-car stiffness between the tanks. Lateral ends of the rigid crossbeam members may be contoured to the arcuate periphery of the tanks to lock the tanks in place. In addition to enhancing the structural integrity of the pack housing and optimizing side-impact performance of the RESS, disclosed battery pack housing configurations decrease the system volume and mass of the RESS. By reducing packaging space and RESS gross weight, disclosed concepts also help to increase driving range, fuel economy, and vehicle performance.

Aspects of this disclosure are directed to electrochemical battery assemblies with integrated fuel tanks. In an example, a RESS assembly includes a battery pack housing with an internal battery module compartment that is located between two tank mounting cavities. Each mounting cavity is recessed into a respective lateral side of the battery pack housing. Multiple rechargeable battery modules are electrically interconnected with one another and mounted inside the battery module compartment. Each battery module contains multiple battery cells, for example a stack of series-connected lithium-ion pouch cells. A fuel tank is mounted in each of the tank mounting cavities on the lateral sides of the battery pack housing. Each fuel tank may be fabricated, in whole or in part, from a CFRP material or similarly suitable fiber-reinforced polymer (FRP) material. These fuel tanks store and selectively dispense fuel, such as a hydrogen-rich, compressed gas fuel.

Additional aspects of this disclosure are directed to motor vehicles equipped with electrochemical battery assemblies having integrated fuel tanks. As used herein, the terms "vehicle" and "motor vehicle" may be used interchangeably and synonymously to include any relevant vehicle platform, such as passenger vehicles (ICE, HEV, FEV, FCEV, fully and partially autonomous, etc.), commercial vehicles, industrial vehicles, tracked vehicles, off-road and all-terrain vehicles (ATV), motorcycles, farm equipment, watercraft, aircraft, etc. For non-automotive applications, disclosed concepts may be implemented for all logically relevant uses, including stand-alone power stations, portable power packs, backup generator systems, pumping equipment, machine tools, appliances, etc. In an example, a motor vehicle includes a vehicle body with a passenger compartment, multiple road wheels mounted to the vehicle body, and other standard original equipment. A prime mover, which may be in the nature of an engine assembly (e.g., for ICE-based powertrains), an electric traction motor (e.g., for full electric powertrains), or both an engine assembly and a traction motor (e.g., for hybrid electric powertrains), selectively drives one or more of the road wheels to thereby propel the vehicle.

Continuing with the discussion of the above example, the vehicle also includes a fuel cell system with a fuel cell stack that is operable to convert a hydrogen-rich fuel into electricity. Electricity generated by the fuel cell system is stored in a resident RESS assembly. The RESS assembly includes a battery pack housing that is attached to the vehicle body and includes an internal battery module compartment, which is located between two recessed tank mounting cavities. Each tank mounting cavity is recessed into a respective lateral side of the battery pack housing. A rectangular array of battery modules is mounted inside the battery module compartment. Each battery module contains a discrete stack of battery cells that selectively stores and dispenses electricity output by the fuel cell stack. A pair of FRP fuel tanks is mounted in the tank mounting cavities on the lateral sides of the battery pack housing. Each of the fuel tanks stores and selectively dispenses the hydrogen rich fuel for the fuel cell system.

Aspects of this disclosure are also directed to methods for making and methods for using electrochemical battery assemblies with integrated fuel tanks. In an example, a method is presented for assembling a RESS assembly. This representative method includes, in any order and in any combination with any of the above and below disclosed options and features: assembling a battery pack housing to define therein a battery module compartment located between first and second tank mounting cavities, the first and second tank mounting cavities recessed into first and second lateral sides of the battery pack housing; mounting a plurality of battery modules inside the battery module compartment, each of the battery modules containing a stack of battery cells; and mounting first and second fuel tanks in the first and second tank mounting cavities on the first and second lateral sides, respectively, of the battery pack housing, each of the first and second fuel tanks configured to store and selectively dispense a fuel.

For any of the disclosed RESS assemblies, methods, and vehicles, each fuel tank may include an elongated cylindrical casing that is formed, in whole or in part, from an FRP material, such as a high-strength CFRP. The longitudinal length of each cylindrical casing, e.g., including hemispherical end caps, may be substantially equal to the longitudinal length of the battery pack housing. As a further option, the fuel contained inside the fuel tanks is a hydrogen-based gas; in this instance, each fuel tank may include a high-density polymer liner that is located inside the cylindrical casing and contains therein the hydrogen-based fluid.

For any of the disclosed RESS assemblies, methods, and vehicles, tightening straps may removably mount the fuel tanks to the battery pack housing. In this instance, the tightening straps may include a respective series of tightening straps spaced along the longitudinal tank length of each fuel tank. As yet a further option, inboard segments of the tightening straps are anchored to interior walls of the battery pack housing, whereas outboard ends of the tightening straps are fastened together by releasable clamps.

For any of the disclosed RESS assemblies, methods, and vehicles, compressible isolation pads may be wrapped around the fuel tanks. Each compressible pad may be a single-piece construction or a multipiece construction. For instance, a first set of inner and outer pads may be pressed against inboard and outboard surfaces of the first fuel tank, and a second set of inner and outer pads may be pressed against inboard and outboard surfaces of the second fuel tank. As yet a further option, an arrangement of contoured rails extends along the longitudinal length of the battery pack housing, each wedged between a fuel tank and an interior wall of the battery pack housing.

For any of the disclosed RESS assemblies, methods, and vehicles, the battery pack housing may include top and bottom plates that extend transversely between the two fuel tanks and respectively define the uppermost and lowermost extents of the battery module compartment. Sealing flanges may fluidly seal transverse edges of the top and bottom plates to outer diameter (OD) surfaces of the fuel tanks. As yet a further option, a center plate extends transversely between and is radially aligned with the fuel tanks. The battery modules may be buttressed on the bottom and center plates. Transversely oriented crossbeam members may be interleaved with the battery modules inside the central battery module compartment.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Figure 1:
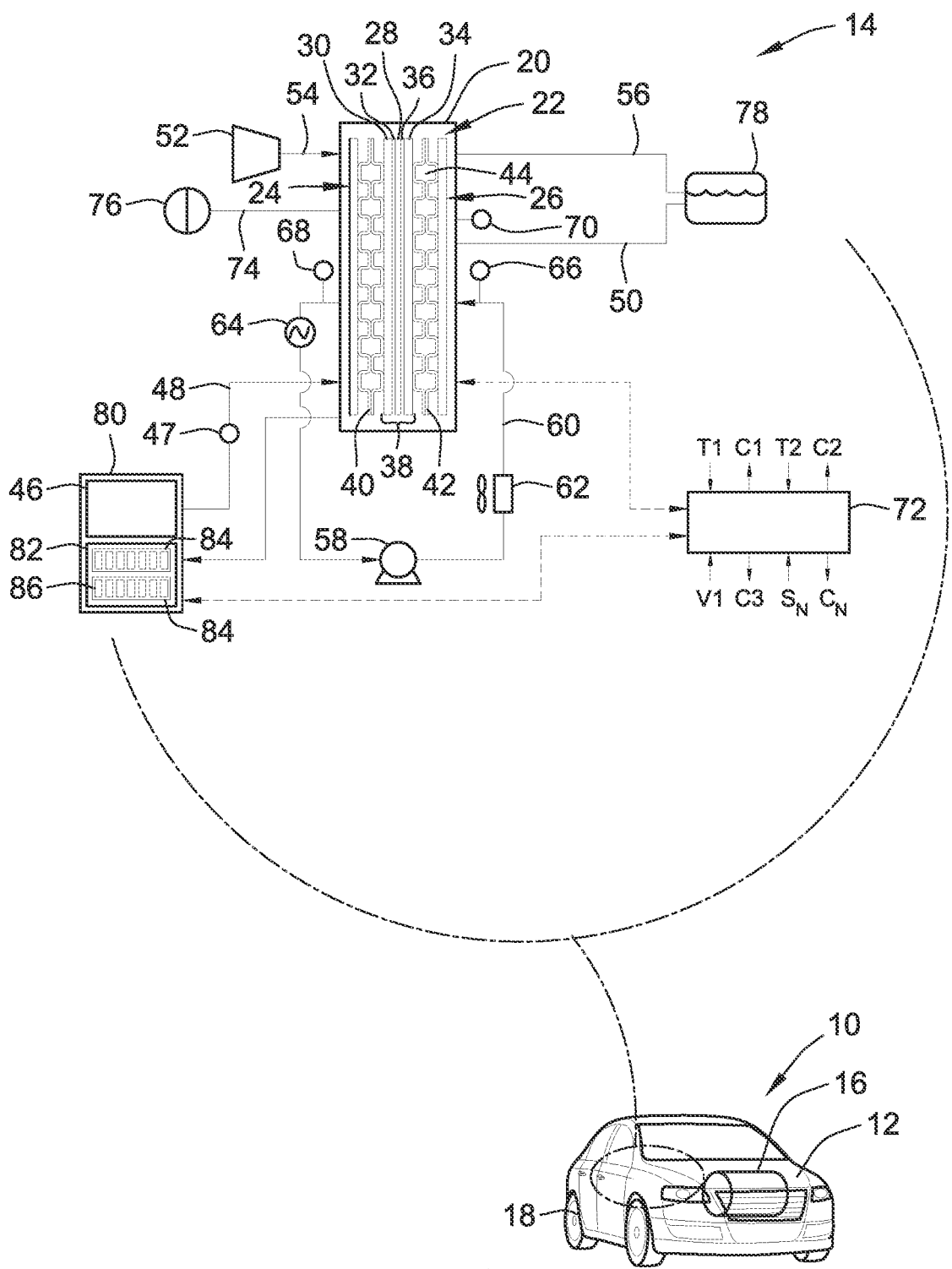
FIG. 1 is an elevated, perspective-view illustration of a representative motor vehicle with an inset schematic view of examples of a fuel cell system and a rechargeable energy storage system (RESS) in accord with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, fuel cell electric passenger vehicle. The illustrated automobile 10—also referred to herein as "motor vehicle" or "vehicle" for short—is merely an exemplary application with which novel aspects of this disclosure may be practiced. In the same vein, implementation of the present concepts into a PEMFC-type fuel cell system should also be appreciated as a representative implementation of the novel concepts disclosed herein. As such, it will be understood that aspects of the present disclosure may be applied to other fuel cell architectures, incorporated into any logically relevant type of vehicle, and utilized for both automotive and non-automotive applications alike. Lastly, only select components have been shown and will be described in additional detail herein. Nevertheless, the vehicles, fuel cell systems, and RESS assemblies discussed below may include numerous additional and alternative features, and other available peripheral components and hardware, for carrying out the various methods and functions of this disclosure.

Packaged within the vehicle body 12 of automobile 10 is a representative fuel cell system 14 for powering one or more traction motors, such as electric motor generator unit (MGU) 16, operable for driving a combination of the vehicle's road wheels 18. Proton exchange membrane fuel cell system 14 of FIG. 1 is equipped with one or more fuel cell stacks 20, each of which is composed of multiple fuel cells 22 of the PEM type that are mounted in electrical series or parallel with one another. In the illustrated architecture, each fuel cell 22 is a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Likewise, a cathode diffusion media layer 34 is provided on the cathode side 26 of the PEMFC 22, with a cathode catalyst layer 36 interposed between and operatively connecting the membrane 28 and corresponding diffusion media layer 34. These two catalyst layers 32 and 36 cooperate with the membrane 28 to define, in whole or in part, a membrane electrode assembly (MEA) 38.

The diffusion media layers 30 and 34 are porous constructions that provide for fluid inlet transport to and fluid exhaust transport from the MEA 38. An anode flow field plate (or "first bipolar plate") 40 is provided on the anode side 24 in abutting relation to the anode diffusion media layer 30. In the same vein, a cathode flow field plate (or "second bipolar plate") 42 is provided on the cathode side 26 in abutting relation to the cathode diffusion media layer 34. Coolant flow channels 44 traverse each of the bipolar plates 40 and 42 to allow cooling fluid to flow through the fuel cell 22. Respective fluid inlet ports and manifolds direct hydrogen fuel and oxidant to passages in the anode and cathode flow field plates. A central active region of the anode's bipolar plate 40 that confronts the proton-conductive membrane 28 may be fabricated with an anode flow field composed of serpentine flow channels for distributing hydrogen over an opposing face of the membrane 28. The MEA 38 and bipolar plates 40, 42 may be stacked together between stainless steel clamping plates and monopolar end plates (not shown). These clamping plates may be electrically insulated from the end plates by a gasket or dielectric coating (not shown). The fuel cell system 14 may also employ anode recirculation where an anode recirculation gas is fed from an exhaust manifold through an anode recirculation line for recycling hydrogen back to the anode side 24 input so as to conserve hydrogen gas in the stack 20.

Hydrogen ($H_2$) inlet flow—be it gaseous, concentrated, entrained or otherwise—is transmitted from a hydrogen/nitrogen source 46 to the anode side 24 of the fuel cell stack 20 via a fluid injector 47 coupled to a (first) fluid intake conduit or hose 48. Anode exhaust exits the stack 20 via a (first) fluid exhaust conduit or hose 50. A compressor or pump 52 provides a cathode inlet flow, e.g., of ambient air, deionized water (DI $H_2O$), and/or concentrated gaseous oxygen ($O_2$), via a (second) fluid intake line or manifold 54 to the cathode side 26 of the stack 20. Cathode exhaust is output from the stack 20 via a (second) fluid exhaust conduit or manifold 56. Flow control valves, flow restrictions, filters, and other available devices for regulating fluid flow can be implemented by the system 10 of FIG. 1. Electricity generated by the fuel cell stacks 20 and output by the fuel cell system 14 may be transmitted for storage to an in-vehicle traction battery pack 82 within a resident rechargeable energy storage system (RESS) 80.

Fuel cell system 14 of FIG. 1 may also include a thermal sub-system operable for controlling the temperature of the fuel cell stack 20 during preconditioning, break-in, and post-conditioning. According to the illustrated example, a cooling fluid pump 58 pumps a cooling fluid through a coolant loop 60 to the fuel cell stack 20 and into the coolant channels 44 in each cell 22. A radiator 62 and a heater 64 fluidly coupled in the coolant loop 60 are used to maintain the stack 20 at a desired temperature. This fuel cell conditioning system may be equipped with various sensing devices for monitoring system operation and progress of fuel cell break-in. For instance, a (first) temperature sensor 66 measures, monitors or otherwise detects a temperature value of the coolant at a coolant inlet to the fuel cell stack 20, and a (second) temperature sensor 68 measures, monitors or otherwise detects a temperature value of the coolant at a coolant outlet of the stack 20. An electrical connector or cable 74 connects the fuel cell stack 20 to an electric power supply 76, which may be employed to apply a current to each cell 22 in the stack 20 during cell stack break-in. A voltage/current sensor 70 is operable to measure, monitor or otherwise detect fuel cell voltage and/or current across the fuel cells 22 in the stack 20 during break-in operations.

Programmable electronic control unit (ECU) 72 helps to control operation of the fuel cell system 14. As an example, ECU 72 receives one or more temperature signals Ti from the temperature sensor 62 that indicates the temperature of the fuel cell stack 20; ECU 72 may be programmed to responsively issue one or more command signals C1 to modulate operation of the stack 20. ECU 72 of FIG. 1 also receives one or more voltage signals V1 from the voltage sensor 70; ECU 72 may be programmed to responsively issue one or more command signals C2 to modulate operation of the hydrogen source 46 and/or compressor/pump 52 to thereby regulate the electrical output of the stack 20. ECU 72 of FIG. 1 is also shown receiving one or more fluid level signals L1 from a water level indicator; ECU 72 may be programmed to responsively issue one or more command signals C3 to modulate operation of a fuel cell exhaust aftertreatment system. Additional sensor signals SN may be received by, and additional control commands CN may be issued from the ECU 72, e.g., to control any other subsystem or component illustrated and/or described herein. The ECU 72 may emit a command signal to transmit evolved hydrogen and liquid $H_2O$ from the cathode side 26 through fluid exhaust conduit 56 to a water separator 78 (FIG. 1) where hydrogen and water from the cathode are combined with depleted hydrogen exhausted from the anode through fluid exhaust conduit 50. ECU 72 may then command this water separator 78 to separate hydrogen from water and, when desired, recycle the separated hydrogen back to the anode fluid inlet.

Discussed below are RESS architectures that combine a multi-module traction battery pack and a multi-tank fuel system into a single unitary structure. Doing so enables a reduction in overall mass to both the battery and fuel systems while decreasing packaging space requirements for the tanks and pack. Longitudinal reinforcement rails may sit flush against the outer periphery of the cylindrical tanks, e.g., for improved tank mounting integrity and vehicle body stiffness for forward-impact performance. A module-mounting center plate may help to line up the tanks' cylindrical center lines to improve cross-vehicle stiffness. Angular ends of RESS crossbeam member beams may be contoured to match the cylindrical shape of the tanks, locking in the RESS vertical structure to the stiffness of the tank system. These transversely mounted crossbeam members not only retain the positioning of the internal battery modules but also improve housing integrity for side-impact performance. The cylindrical shape of the fuel tanks may help to increase sealing flange areas that are used to seal the enclosed structure containing the pack's stacked battery modules.

To secure the fuel tanks to the battery pack housing, a unique mounting system employs tightening straps in conjunction with isolation pads that allow the tanks to expand and contract with variations in internal gas pressure. These tank-tightening straps enable even external mounting pressures on the fuel tanks while securing the tanks in place to prevent inadvertent vertical tank movement. The sidemounted, high-pressure fuel tanks may also help to protect the RESS by spreading point load during side-impact loading over the entire length of the tank. The center plate maintains a fixed distance between the fuel tanks and acts as a structural stiffening member between the tanks. Top and bottom RESS plates cooperate with the fuel tanks to house the battery modules and also to add crosswise stiffness and improved sealing interfaces for the RESS.

Figure 2:
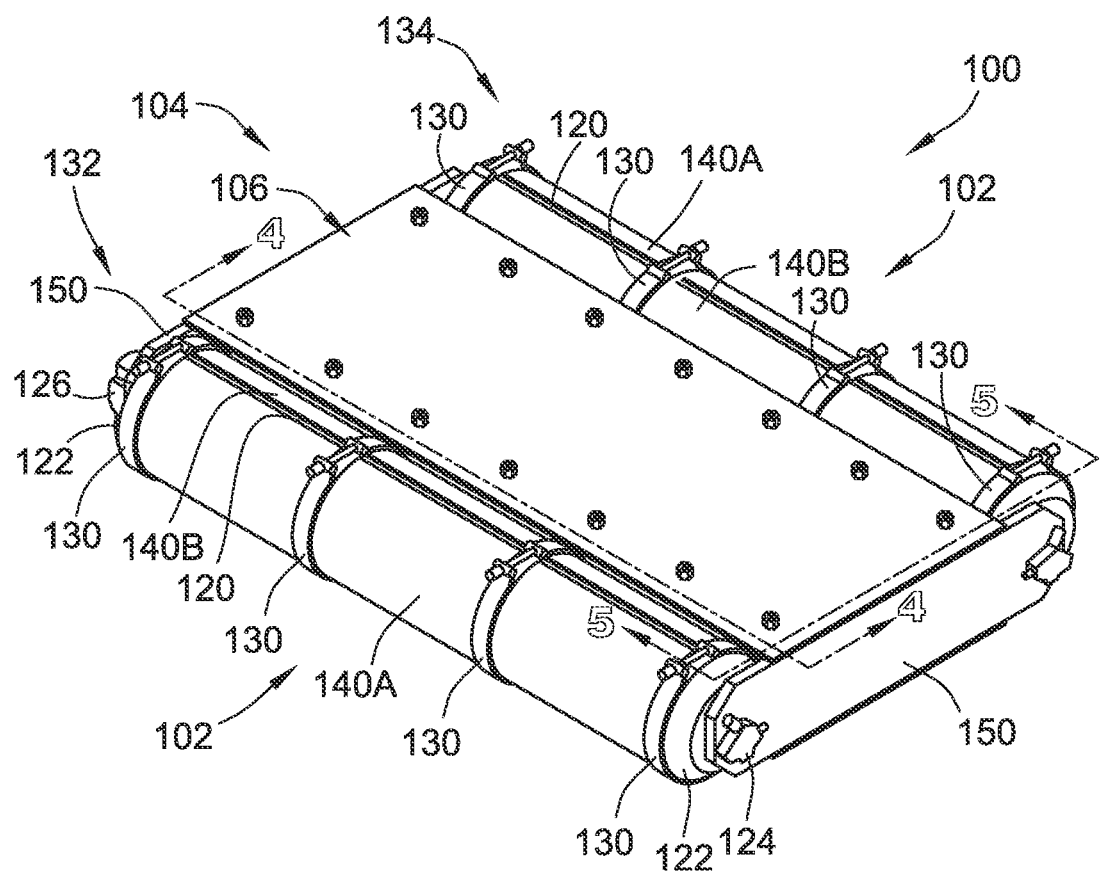
FIG. 2 is an elevated, perspective-view illustration of a representative RESS assembly that combines the fuel tanks of a multi-tank fuel system into the pack housing of a multi-module battery pack in accordance with aspects of the present disclosure.
Figure 3:
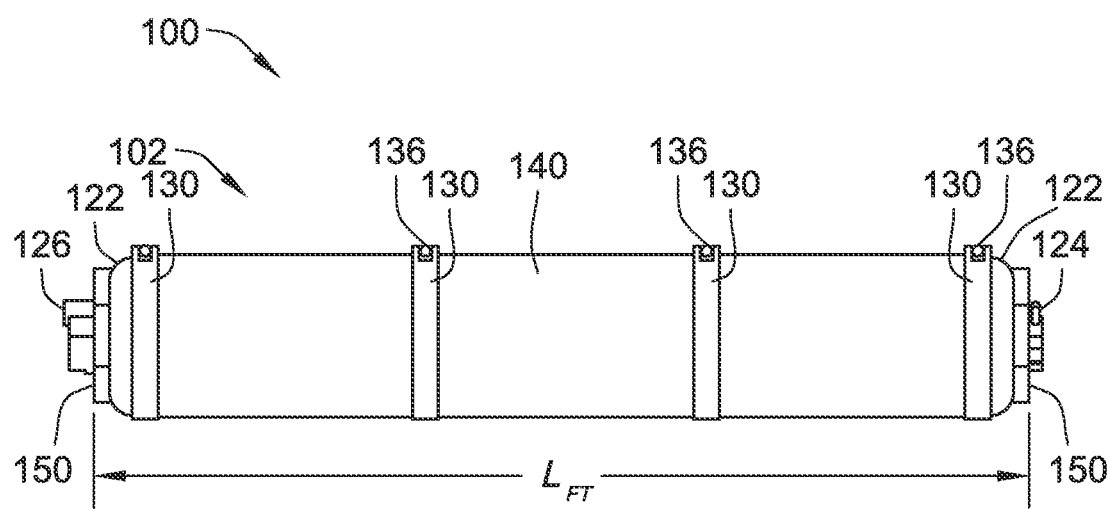
FIG. 3 is a side-view illustration of the RESS assembly of FIG. 2.

Turning next to FIGS. 2 and 3, there is shown an example of a RESS assembly 100 that combines the fuel tanks of a multi-tank fuel system into the pack housing of a multi-module battery pack. The RESS assembly 100 may be adapted for high-capacity storage of electrical energy, such as that output by fuel cell system 14, and supplying high-voltage, direct-current (HVDC) electrical energy for powering a load, such as MGU 16 and vehicle 10 of FIG. 1. Moreover, RESS assembly 100 may be adapted for secure storage of a fuel, such as a hydrogen-rich liquid or gas, and selectively supplying stored fuel to an energy conversion system, such as fuel cell system 14 in FIG. 1. For an FCEV automotive application, this RESS 100 may be a deep-cycle, high-ampere capacity battery system rated for approximately 350 to 800 VDC or more, for example, depending on a desired vehicle range, gross vehicle weight, and power ratings of the various accessory loads drawing electrical power from the RESS 100. At the same time, this RESS 100 may act as a Type IV composite-overwrapped, compressed-hydrogen gas vessel with a 5-10 kg/tank capacity and a 350-700 bar (5,000-10,000 psi) per tank nominal working-pressure. While described herein for use as the RESS 80 of FIG. 1, the multi-module, multi-tank RESS assembly 100 of FIGS. 2-5 may be employed for automotive and non-automotive applications alike.

Figure 4:
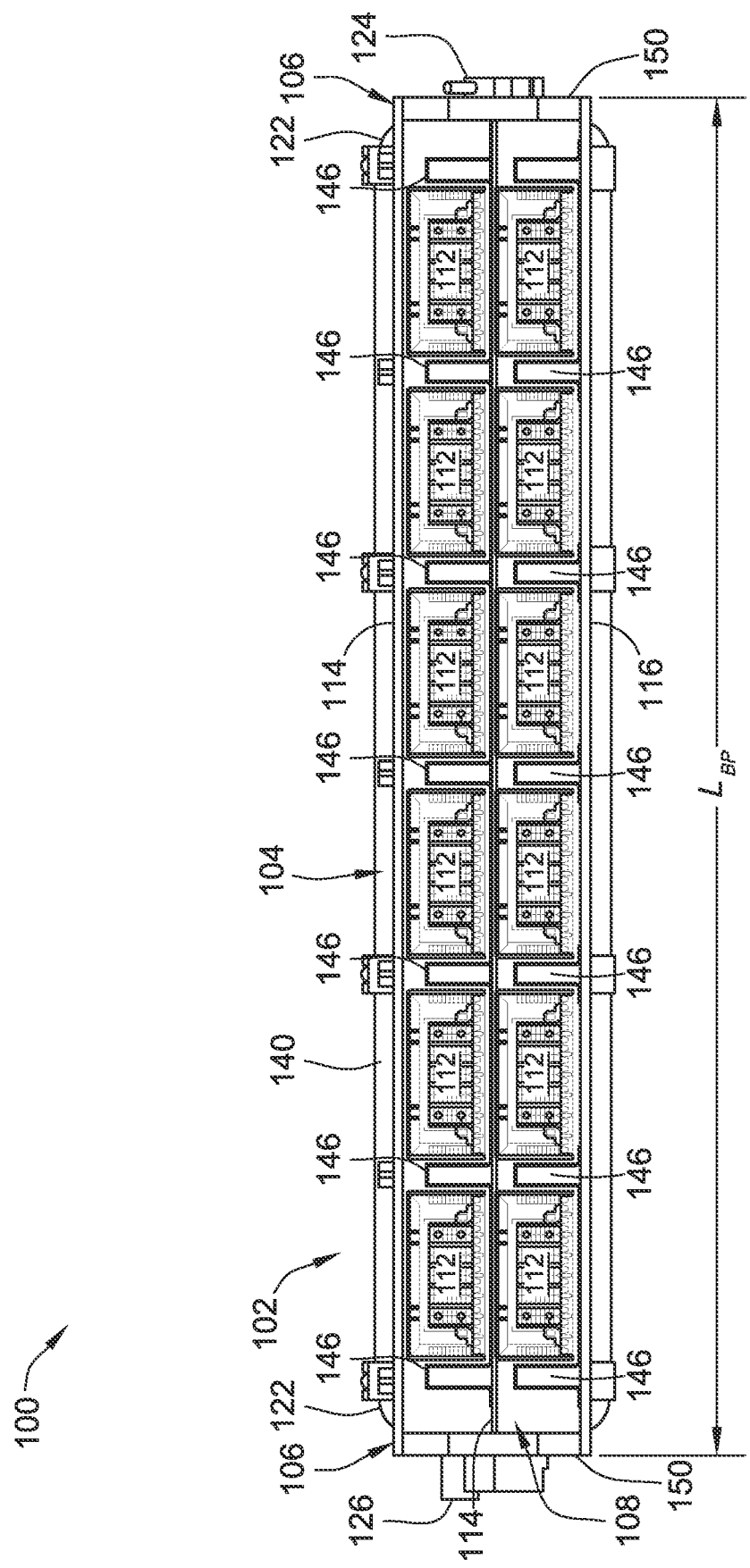
FIG. 4 is a sectional side-view illustration of the RESS assembly of FIG. 2 taken in partial cross-section along line 4-4.
Figure 5:
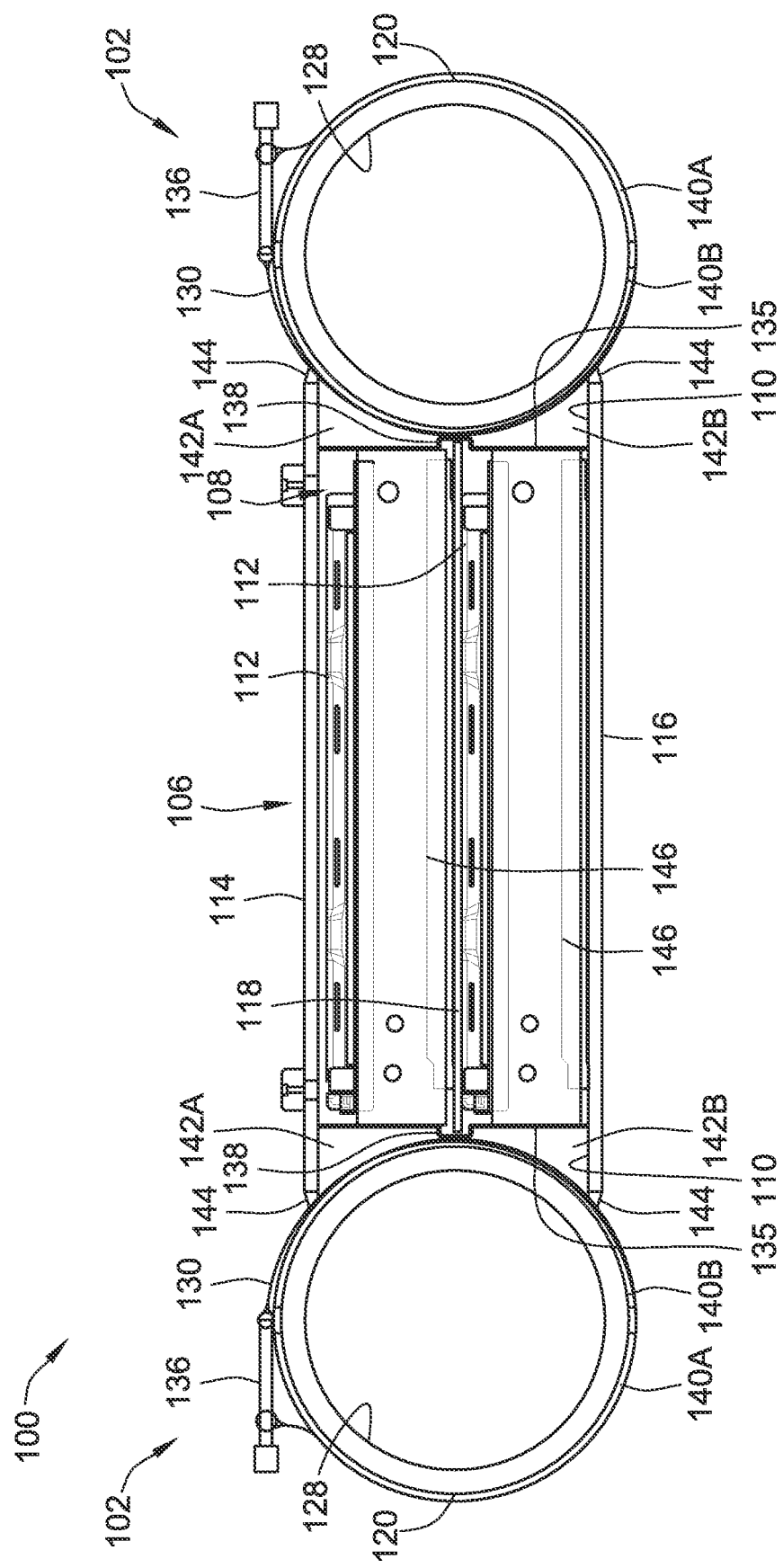
FIG. 5 is a sectional end-view illustration of the RESS assembly of FIG. 2 taken in partial cross-section along line 5-5.

The RESS assembly 100 is typified by a battery pack 104 that is flanked on port and starboard sides thereof with a pair of fuel tanks 102. As noted above, the battery pack 104 may be in the nature of a traction-type battery pack used for propulsion of an electric-drive motor vehicle. In this regard, the battery pack 104 employs a weather-resistant, temperature-controlled outer housing 106 with an internal battery module compartment 108 (FIGS. 4 and 5) that is sandwiched between a pair of tank mounting cavities 110 (FIG. 5). The two tank mounting cavities 110 extend the entire fore-aft length $L_{BP}$ of the battery pack housing 106, each recessed into a respective lateral side of the pack housing 106. With the tanks 102 removed, longitudinal ends and outboard margins of the tank mounting cavities 110 are unobstructed and open to allow for ease of alignment and installation of the fuel tanks 102. It should be appreciated that the RESS assembly 100 may incorporate greater or fewer than the illustrated two fuel tanks 102 and, concomitantly, may necessitate greater or fewer than two tank mounting cavities 110.

With collective reference to FIGS. 2 and 3, the battery pack 104 stores one or more electrochemical battery modules 112 within the protective, electrically insulating battery pack housing 106. FIG. 4 portrays the RESS 100 containing twelve individual battery modules 112 arranged in a rectangular 2×6 array and mounted inside the battery module compartment 108. Nevertheless, RESS 100 may be scaled up or scaled down to incorporate additional or fewer modules depending, for example, on the performance requirements for the intended application of the RESS 100. As shown, the battery pack housing 106 is a rigid box-like structure with a top (first) plate 114 extending transversely between the fuel tanks 102 and defining the uppermost extent of the battery module compartment 108, and a bottom (second) plate 116 extending transversely between the fuel tanks 102 and defining the lowermost extent of the battery module compartment 108. A center plate 118 also extends transversely between the fuel tanks 102, vertically spaced from and interposed between the top and bottom plates 114, 116, and radially aligned with the center of both tanks 102.

All three plates 114, 116 and 118 may be substantially flat, mutually parallel, and formed from a rigid sheet metal or plastic material. A lower (first) row of battery modules 112 is buttressed on the bottom plate 116 and an upper (second) row of battery modules 112 is buttressed on the center plate 118. A sealing flange 144 fluidly seals transverse edges of the top and bottom plates 114, 116 to the fuel tanks 102. Two rigid end plates 150 close off the opposing longitudinal ends of the battery pack housing 106 and provide goose-neck mounting interfaces for the fuel tanks 102. While portrayed herein as a generally polyhedral structure with two rows of modules, the battery pack 104 may take on alternative shapes, sizes, and module arrangements.

According to the representative configuration, the traction battery pack 104 employs rechargeable lithium-class (secondary) battery modules (e.g., modules 84 of FIG. 1). Aspects of the disclosed concepts may be similarly applicable to other electric storage unit architectures, including those employing nickel metal hydride (NiMH) batteries, lead acid batteries, lithium polymer batteries, or other applicable type of rechargeable electric vehicle battery (EVB). Each battery module 112 may include a series of electrochemical battery cells, such as pouch-type lithium ion (Li-ion) or Li-ion polymer battery cells 86 of FIG. 1. An individual Li-ion battery module 112, for example, may be typified by a grouping of 10-45 battery cells that are stacked in side-by-side facing relation with one another and connected in parallel or series for storing and supplying electrical energy. A battery cell may be a multi-layer construction that is provided with an outer battery casing, such as an envelope-like pouch. Opposing sides of the pouch may be formed of aluminum, steel, or other suitable material; both sides may be covered with a dielectric coating that insulates the metal from adjacent cells and from the cell internal elements. These two sides are connected, e.g., via welding or crimping, to generally enclose therein a solid or liquid electrolyte composition that conducts positive Lithium ions between working electrodes. Extending outwardly from opposing longitudinal edges of the pouch are negative (anode) and positive (cathode) terminals for making electrical connections with negative and positive electrodes packaged within the internal volume of cell pouch. While described as a silicon-based, Li-ion "pouch cell" battery, the battery cells may be adapted to other constructions, including cylindrical and prismatic constructions.

Affixed to opposing sides of the battery pack 104 are two discrete fuel tanks 102, each of which is mounted in a respective tank mounting cavity 110 and projects outward from the battery pack housing 106. These fuel tanks 102 store and selectively dispense a fuel, most likely a compressed hydrogen gas but similarly applicable to hydrogen-rich ammonia, methanol, and ethanol, as well as methane and other natural gases or petroleum-based fuels. For ease of manufacture and simplicity of design, both of the illustrated fuel tanks 102 of FIGS. 2-5 may be substantially structurally identical, taking into account manufacturing tolerances and innate physical disparities. By way of non-limiting example, each fuel tank 102 is fabricated with a capsule-shaped casing 120 (FIG. 3) that may be formed, in whole or in part, from a fiber-reinforced polymer (FRP) material, such as carbon-fiber reinforced polymer (CFRP). For implementations in which the stored fuel is a hydrogen-based compressed gas, each fuel tank 102 employs a high-density polymer liner 128 that is overwrapped by a carbon-fiber composite, i.e., enclosed within the cylindrical casing 120, to contain the fuel.

Dome-shaped metal end caps 122 seat flush onto hemispherical heads of the casing 120 at opposing longitudinal ends of the fuel tanks 102 to structurally reinforce the elongated cylindrical casing 120. Located on one end cap 122 is a thermally activated pressure relief device (TPRD) 124 that is operable to evacuate compressed gas from the tank 102 under predefined operating conditions (e.g., excessive pressure and/or temperature). At the opposite end of the tank 102 is a mouthpiece 126 with an internally threaded metal boss (not visible) through which a metered amount of fuel is dispensed to a mated fuel line (not shown) during normal operation of the RESS assembly 100. It should be appreciated that the tanks 102 may individually or collectively take on alternative designs and sizes from those shown by way of example in the Figures.

For at least some embodiments, the casing 120 of each tank 102 may be made using multiple layers of continuous fiber filament windings, such as TORAY® T700 fibers. The angle of orientation of the embedded fiber layers may be homogenous or may vary by layer, typically at about 10° to about 90° from one layer to the next. Fiber-to-resin content may be about 55-75 percent by weight (wt %) or, for some desired designs, about 65 wt % using a thermoset or thermoplastic epoxy resin. A wall thickness of the elongated cylindrical casing 120 may be proportional to the casing's diameter. In a non-limiting example, the tank 102 may have a diameter of about 475-525 mm (e.g., —500 mm) with a wall thickness of about 40-50 mm (e.g., —46 mm) employing about 90-120 layers (e.g., 110 layers) of fiber. It may be desirable, for some applications, that the tank casing 120 exhibit a tensile strength of at least about 4500 MPa, a tensile modulus of at least about 200 GPa, a density of at least about 1.5 g/cm$^3$, with a fiber diameter of about 5-10 μm. The longitudinal length $L_{FT}$ of the cylindrical casing 120, e.g., with the end caps 122, may be substantially equal to the longitudinal length $L_{BP}$ of the battery pack housing 106.

Although innumerable options are envisioned for physically attaching the tanks 102 to the pack 104, the representative RESS assembly 100 employs a unique strap system to removably mount the fuel tanks 102 to the battery pack housing 106. In particular, a first series 132 of metal tightening straps 130 is spaced along the longitudinal length $L_{FT}$ of the port-side (first) fuel tank 102, and a second series 134 of metal tightening straps 130 is spaced along the longitudinal length $L_{FT}$ of the starboard-side (second) fuel tank 102. As best seen in FIG. 5, each tightening strap 130 includes an inboard segment (i.e., section closest to the longitudinal centerline of the RESS assembly 100) that is interposed between opposing ends of the strap 130 and anchored to a mounting rail 138 protruding from an interior wall 135 of the battery pack housing 106. The opposing ends of the strap 130 are fastened together by a releasable clamp, such as a T-bolt clamp 136, a worm-gear clamp, a quick-release clamp, or other similarly suitable latching device. Alternatively, opposing ends of the tightening straps 130 may be joined via welding or rivets or, alternatively, may all be fastened to a shared tightening plate that extends the length of the tank casing 120.

Interleaved between each tank casing 120 and its corresponding succession of tightening straps 130 is an isolation pad 140 that prevents surface chafing of the tank casing 120 and allows the casing 120 to expand and contract with variations in internal gas pressure. The representative RESS assembly 100 is shown using a pair of compressible isolation pads—outer pad 140A and inner pad 140B—that is wrapped around and laid flush against each fuel tank 102. The outer pad 140A is pressed directly against the outboard-facing surface of the fuel tank's FRP casing 120, and the inner pad pressed 140B is pressed directly against the inboard surface of the casing 120. Each pad 140A, 140B may be a uniform-thickness rectangular cushion formed from a high durometer elastomer. Alternative embodiments may employ a single-piece, sleeve-like pad for covering each tank 102 or, alternatively, may employ a series of discrete annular pads, each of which is dedicated to a respective strap 130.

To improve the structural integrity of the RESS assembly 100 and concomitantly increase fore-aft and crosswise vehicle body stiffness for forward and side impact performance, the battery pack housing 106 may incorporate a rail-and-beam pattern that reinforces the load-bearing capacity of the assembly 100. For instance, the RESS assembly 100 is shown in FIG. 5 with four elongated rails—two upper and two lower contoured rails 142A and 142B, respectively—that extend along the longitudinal length $L_{BP}$ of the battery pack housing 106. A pair of the contoured rails 142A, 142B is wedged between each fuel tank 102 and one of the interior walls 135 separating its tank mounting cavity 110 from the battery module compartment 108. Outboard faces of these contoured rails 142A, 142B are arched to conform to and press flush against the OD surface of the inner isolation pad 140B.

A train-track pattern of crossbeam members 146 is shown in FIGS. 4 and 5 extending between the interior walls 135 of the battery pack housing 106 and aligned with the contoured rails 142A, 142B. These crossbeam members 146 provide structural support for the battery modules 112 and help transfer loads across the battery pack 104 between the fuel tanks 102, e.g., in the event of a side-impact scenario. Each crossbeam member 146 may be welded at opposing lateral ends thereof to the interior walls 135; the interior walls 135, in turn, may be welded to the contoured rails 142A, 142B. As noted above, the mating surfaces of the longitudinally oriented contoured rails 142A, 142B follow the OD shape of the tanks 102; this functions to "lock in" the up and down movement of the system and to transfer loading between the tanks 102 in the event of a sideways applied external force.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A rechargeable energy storage system (RESS) assembly, comprising:
   a battery pack housing defining therein a battery module compartment located between first and second tank mounting cavities, the first and second tank mounting cavities recessed into first and second lateral sides of the battery pack housing;
   a plurality of battery modules mounted inside the battery module compartment, each of the battery modules containing a stack of battery cells; and
   first and second fuel tanks mounted in the first and second tank mounting cavities on the first and second lateral sides, respectively, of the battery pack housing, each of the first and second fuel tanks configured to store and selectively dispense a fuel.

2. The RESS assembly of claim 1, wherein each of the first and second fuel tanks includes an elongated cylindrical casing formed with a fiber-reinforced polymer (FRP) material.

3. The RESS assembly of claim 2, wherein the elongated cylindrical casing has a longitudinal tank length substantially equal to a longitudinal pack length of the battery pack housing.

4. The RESS assembly of claim 2, wherein the fuel is a hydrogen-based fluid, and wherein each of the first and second fuel tanks includes a high-density polymer liner located inside the cylindrical casing and containing therein the hydrogen-based fluid.

5. The RESS assembly of claim 2, wherein the FRP material is a carbon-fiber reinforced polymer (CFRP).

6. The RESS assembly of claim 1, further comprising a plurality of tightening straps removably mounting the first and second fuel tanks to the battery pack housing.

7. The RESS assembly of claim 6, wherein the tightening straps include first and second series of tightening straps spaced along longitudinal tank lengths of the first and second fuel tanks, respectively.

8. The RESS assembly of claim 6, wherein each of the tightening straps includes an inboard segment interposed between opposing outboard ends, the inboard segment anchored to an interior wall of the battery pack housing, and the outboard ends fastened together by a releasable clamp.

9. The RESS assembly of claim 1, further comprising first and second compressible isolation pads wrapped around the first and second fuel tanks, respectively.

10. The RESS assembly of claim 9, wherein the first compressible pad includes first inner and outer pads pressed against first inboard and outboard surfaces, respectively, of the first fuel tank, and the second compressible pad includes second inner and outer pads pressed against second inboard and outboard surfaces of the second fuel tank, respectively.

11. The RESS assembly of claim 10, wherein the battery pack housing includes a center plate extending transversely between and radially aligned with the first and second fuel tanks.

12. The RESS assembly of claim 1, wherein the battery pack housing includes top and bottom plates extending transversely between the first and second fuel tanks and respectively defining uppermost and lowermost extents of the battery module compartment.

13. The RESS assembly of claim 12, further comprising a plurality of sealing flanges fluidly sealing transverse edges of the top and bottom plates to the first and second fuel tanks.

14. The RESS assembly of claim 1, further comprising a plurality of contoured rails extending along a longitudinal pack length of the battery pack housing and wedged between the fuel tanks and interior walls of the battery pack housing.

15. An electric-drive motor vehicle, comprising:
a vehicle body with multiple road wheels attached to the vehicle body;
an electric traction motor attached to the vehicle body and configured to drive one or more of the road wheels to thereby propel the electric-drive vehicle;
a fuel cell system operable to power the electric traction motor and including a fuel cell stack operable to convert a hydrogen-rich fuel into electricity; and
a rechargeable energy storage system (RESS) assembly electrically and/or fluidly connected to the electric traction motor and the fuel cell system, the RESS assembly including:
a battery pack housing attached to the vehicle body and defining therein a battery module compartment located between first and second tank mounting cavities, the first and second tank mounting cavities recessed into first and second lateral sides of the battery pack housing;
a rectangular array of battery modules mounted inside the battery module compartment, each of the battery modules containing a stack of battery cells; and
first and second fiber-reinforced polymer (FRP) fuel tanks mounted in the first and second tank mounting cavities on the first and second lateral sides, respectively, of the battery pack housing, each of the first and second fuel tanks configured to store and selectively dispense the hydrogen-rich fuel.

16. A method of assembling a rechargeable energy storage system (RESS) assembly, the method comprising:
assembling a battery pack housing to define therein a battery module compartment located between first and second tank mounting cavities, the first and second tank mounting cavities recessed into first and second lateral sides of the battery pack housing;
mounting a plurality of battery modules inside the battery module compartment, each of the battery modules containing a stack of battery cells; and
mounting first and second fuel tanks in the first and second tank mounting cavities on the first and second lateral sides, respectively, of the battery pack housing, each of the first and second fuel tanks configured to store and selectively dispense a fuel.

17. The method of claim 16, wherein each of the first and second fuel tanks includes an elongated cylindrical casing formed with a fiber-reinforced polymer (FRP) material, each of the elongated cylindrical casings having a longitudinal tank length substantially equal to a longitudinal pack length of the battery pack housing.

18. The method of claim 16, wherein mounting the first and second fuel tanks to the battery pack housing includes removably mounting the first and second fuel tanks to the battery pack housing via a plurality of tightening straps, the tightening straps including first and second series of tightening straps spaced along longitudinal tank lengths of the first and second fuel tanks, respectively.

19. The method of claim 16, further comprising wrapping first and second compressible isolation pads around the first and second fuel tanks, respectively.

20. The method of claim 16, wherein the battery pack housing includes:
a top plate extending transversely between the first and second fuel tanks and defining an uppermost extent of the battery module compartment;
a bottom plate extending transversely between the first and second fuel tanks and defining a lowermost extent of the battery module compartment; and
a center plate extending transversely between and radially aligned with the first and second fuel tanks.

* * * * *